UNITED STATES PATENT OFFICE.

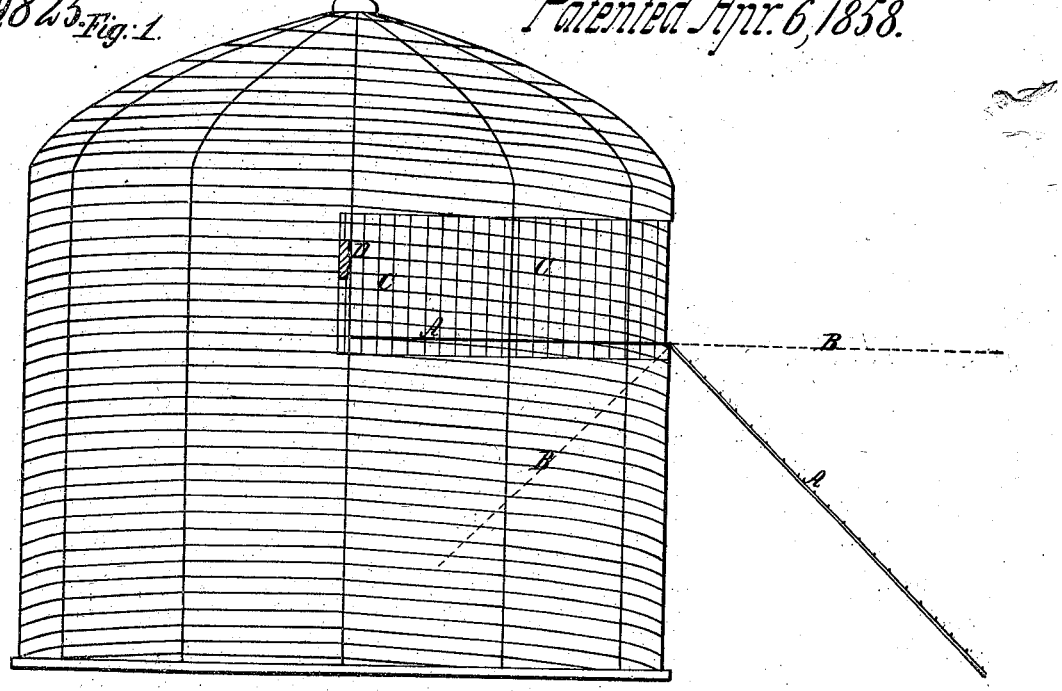
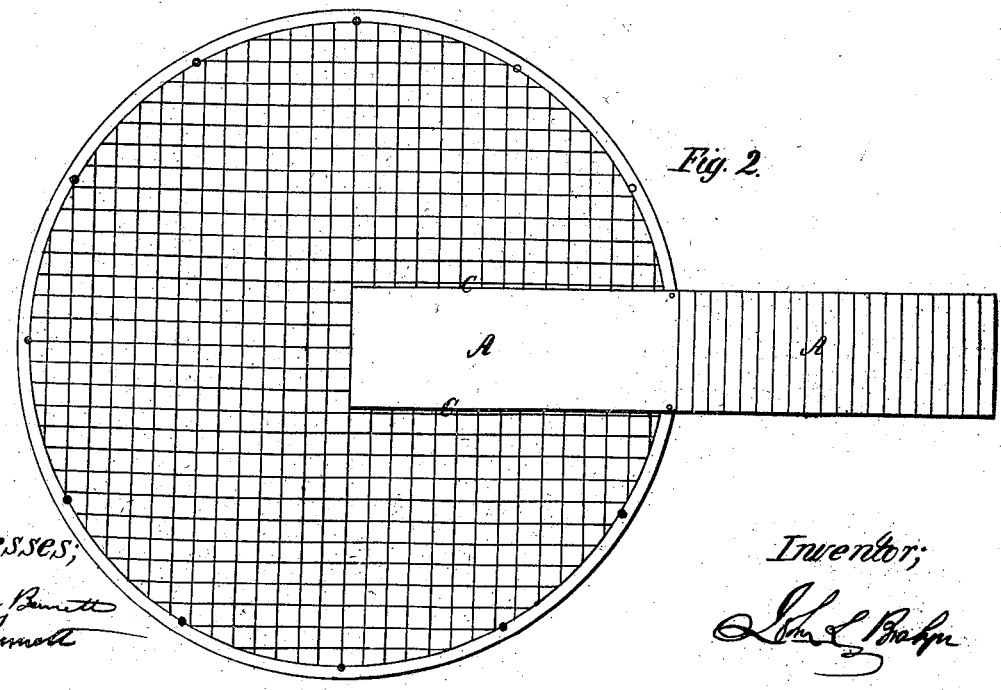

JOHN L. BRABYN, OF NEW YORK, N. Y.

IMPROVEMENT IN TRAPS FOR ANIMALS.

Specification forming part of Letters Patent No. 19,825, dated April 6, 1858.

*To all whom it may concern:*

Be it known that I, JOHN L. BRABYN, of the city and county of New York, in the State of New York, have invented a new and useful Improvement in Animal-Traps; and I do hereby declare that the following is a full, clear, and exact description of my said improvement, reference being had to the accompanying drawings, making part of this specification.

The nature of my invention consists in the construction of a self-setting or self-adjusting trap for the capture of animals of various kinds, so that any number of rats or mice, for instance, may be caught in succession without the trouble of resetting the trap.

To accomplish this design I construct my improved trap of wire or of any other suitable material, and in any form and of any size that may be desirable. In one side and near the top is an opening of suitable capacity to admit the animal for which it is intended, which constitutes the entrance to the trap. This opening is surrounded on three sides and upon the top by a closed partition, thus forming a sort of recess extending to near the center of the trap. The bottom or floor of this recess is level, and forms, in connection with an inclined plane having its position on the outside of the trap, what may be denominated a "tilting platform." The object of the inclined plane is to facilitate the entrance of the animal to the trap by affording an easy means of ascent to the opening in the side, and its connection with the sides of the opening at the bottom by a hinge of proper construction forms the fulcrum upon which it turns. The level portion of the platform forming, as it does, the floor of the recess, serves as a landing-place for the animal after he has ascended the inclined plane to the opening. From this point he can easily determine the precise locality of the bait which has lured him thus far by its savory smell. It will here be observed that the bait is placed at the farther extremity of the recess near the top, and is quite within the center of the trap. As the unsuspecting victim, intent on securing the delicate morsel, advances along the recess, he suddenly feels the floor giving way from beneath him, and ere he is aware of the danger he is safely deposited in the snug quarters arranged for his reception, while the treacherous floor upon which he advanced so boldly has, in consequence of its connection with the inclined plane, returned to its former position, where it is in readiness for another victim.

It will thus be perceived that this trap when once in position can remain any length of time without a visit from the trapper, still performing its office, the bait all the time remaining untouched and secure. Animals of various kinds and also birds may thus be caught without injury to their bodies.

It will be observed that escape is impossible as the only means of entrance to the trap is by the floor of the recess, which after the animal is safely deposited below, instantly returns to its place, effectually closing the entrance and preventing egress in that direction. It will also be seen that the combination of the inclined plane and the horizontal floor of the recess forms the most perfect arrangement for the certain capture of the animal. The floor being horizontal will in consequence be much easier depressed, and affords less facility for the retreat of the animal than would be the case were it in any other position, and, being surrounded on all sides by a smooth partition, there is no chance for him to leap aside when he feels himself going down, so that once upon the horizontal floor his capture is certain.

Figure 1 is a view of a trap constructed of wire, in which the line A A is the tilting platform, comprised of the inclined plane and horizontal floor of the recess as they appear when in a state of readiness to receive the animal. The dotted line B B shows the position of the platform at the moment the animal is deposited within the trap. C C shows the position of the recess, and D the bait.

Fig. 2 is a ground plan in which the letters and parts correspond with those of Fig. 1.

I am aware that a device somewhat similar to that herein described has been used for the capture of animals—as, for instance, a box or other receptacle has been provided with a straight platform properly balanced upon one of its sides for the purpose of dropping the animal into the said receptacle, &c.; but in all such arrangements there has been a want of some means to prevent the animal from leaping aside or retreating at the moment when he felt himself to be in danger, and I am not aware that any such means have hitherto been provided; hence the combination and arrangement herein described.

I do not claim the straight platform in any position; but

I do claim—

A tilting platform in combination with the inclosed recess C C, when the platform is comprised of the inclined plane and horizontal floor A A, as herein described, and for the purpose specified.

JOHN L. BRABYN.

Witnesses:
WILLIAM BENNETT,
ELI G. BENNETT.